United States Patent
Oh et al.

(10) Patent No.: US 7,412,262 B2
(45) Date of Patent: Aug. 12, 2008

(54) MOBILE COMMUNICATION TERMINAL INCLUDING OF WHICH MENU CAN BE CONSTRUCTED BY USING MOBILE FLASH

(75) Inventors: Jong Hwan Oh, Incheon (KR); Sang Bum Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 483 days.

(21) Appl. No.: 11/255,610

(22) Filed: Oct. 21, 2005

(65) Prior Publication Data

US 2006/0135196 A1 Jun. 22, 2006

(30) Foreign Application Priority Data

Dec. 6, 2004 (KR) ............... 10-2004-0101848

(51) Int. Cl.
*H04M 1/00* (2006.01)

(52) U.S. Cl. .............................. 455/566; 455/558

(58) Field of Classification Search .................. None
See application file for complete search history.

(56) References Cited

U.S. PATENT DOCUMENTS 6,400,965 B1 * 6/2002 Phillips et al. .............. 455/558
6,628,971 B1 * 9/2003 Yoon et al. .................. 455/566

FOREIGN PATENT DOCUMENTS

| EP | 1534029 A2 | 5/2005 |
|---|---|---|
| KR | 1020020084993 | 11/2002 |
| KR | 1020030006260 | 1/2003 |
| KR | 1020040009190 | 1/2004 |
| WO | WO 00/55717 | 9/2000 |

OTHER PUBLICATIONS

Waechter, Daniela. Arouse Your Mobile Services to the Life with "Mobile Flash," from *Dynetic Solutions GmbH* press release Apr. 4, 2005; http://www.openpr.de/news/44456/Erwecken-Sie-Ihre-mobilen-Dienste-zum-Leben-mit-Mobile-Flash.html. (as originally printed and English translation).

* cited by examiner

*Primary Examiner*—Thanh C Le
(74) *Attorney, Agent, or Firm*—Ohlandt, Greeley, Ruggiero & Perle, L.L.P.

(57) ABSTRACT

Disclosed is a mobile communication terminal of which menu can be universally constructed using a mobile flash according to a user's taste. The mobile communication terminal comprises an input device section for inputting a reproduction request of a flash movie; a Man Machine Interface (MMI) loading a corresponding movie file based on the reproduction request; a bridge module performing a communication with the MMI to monitor navigation events; a memory section for storing a Extendible Markup Language (XML) document having information about a handset configuration and a menu tree configuration of the terminal; an engine section parsing the XML document read from the memory section to map the XML document with the flash movie and analyzing the parsed XML document according to the navigation events; and a play section for outputting the analyzed XML document contents through a display section. According to the invention, a user can provide a universal and efficient menu and a contents provider can easily produce a menu flash.

7 Claims, 6 Drawing Sheets

Fig. 4

| First Depth Menu | Second Depth Menu | Third Depth Menu |
|---|---|---|
| 1. Message | | |
| | 1. SMS/EMS | |
| | | 1. Creation |
| | | 2. Inbox |
| | 2. MMS | |
| 2. Call Logs | | |
| | 1. Received Calls<br>2. Dialed Calls<br>3. Missed Calls | |
| 3. Sound | | |
| | 1. Ringing Settings<br>2. Message Alert<br>3. Key Tone | |
| 4. Settings | | |
| | 1. Display | |
| 5. Organizer | | |
| | 1. Alarm<br>2. Scheduler<br>3. Memo<br>4. Calculator<br>5. Converter<br>6. Stop Watch | |

Fig. 5

```
<Handset Configuration>
    <Display Size>
        <Width>    </Width>
        <Height>   </Height>
    </Display Size>
    <Menu Tree>
        <Menu Item>
            <Menu Depth Level>   </Menu Depth Level>
            <Menu String Token>   </Menu String Token>
            <Menu Type>    </Menu Type>
            <Command>   </Command>
        </Menu Item>
    </Menu Tree>
</Handset Configuration>
```

Fig. 6

```
<Handset configuration>
    <LCD_SIZE>
        <WIDTH> 120 <WIDTH>
        <HEIGH> 160 <HEIGH>
    <LCD_SIZE>

<MENU_TREE>
        <MENU_ELEMENT>
            <DEPTH_LEVEL> 1 </DEPTH_LEVEL>
            <TITLE_TOKEN>"Message"</TITLE_TOKEN>
            <MENU_TYPE>"Parent"</MENU_TYPE>
            <ACTION_COMMAND>NULL</ACTION_COMMAND>
        </MENU_ELEMENT>
        <MENU_ELEMENT>
            <DEPTH_LEVEL> 2 </DEPTH_LEVEL>
            <TITLE_TOKEN>"SMS/EMS"</TITLE_TOKEN>
            <MENU_TYPE>"Parent"</MENU_TYPE>
            <ACTION_COMMAND>NULL</ACTION_COMMAND>
        </MENU_ELEMENT>
        <MENU_ELEMENT>
            <DEPTH_LEVEL> 3 </DEPTH_LEVEL>
            <TITLE_TOKEN>"Create"</TITLE_TOKEN>
            <MENU_TYPE>"Children"</MENU_TYPE>
            <ACTION_COMMAND>SMS_CREATE</ACTION_COMMAND>
        </MENU_ELEMENT>
        <MENU_ELEMENT>
            <DEPTH_LEVEL> 3 </DEPTH_LEVEL>
            <TITLE_TOKEN>"Inbox"</TITLE_TOKEN>
            <MENU_TYPE>"Children"</MENU_TYPE>
            <ACTION_COMMAND>SMS_INBOX</ACTION_COMMAND>
        </MENU_ELEMENT>
        <MENU_ELEMENT>
            <DEPTH_LEVEL> 2 </DEPTH_LEVEL>
            <TITLE_TOKEN>"MMS"</TITLE_TOKEN>
            <MENU_TYPE>"Children"</MENU_TYPE>
            <ACTION_COMMAND>MMS</ACTION_COMMAND>
        </MENU_ELEMENT>
        <MENU_ELEMENT>
            <DEPTH_LEVEL> 1 </DEPTH_LEVEL>
            <TITLE_TOKEN>"Call Logs"</TITLE_TOKEN>
            <MENU_TYPE>"Parent"</MENU_TYPE>
            <ACTION_COMMAND>NULL</ACTION_COMMAND>
        </MENU_ELEMENT>
                    .
                    .
                    .
                    .
                    .
    </MENU_TREE>
</Handset configuration>
```

MOBILE COMMUNICATION TERMINAL INCLUDING OF WHICH MENU CAN BE CONSTRUCTED BY USING MOBILE FLASH

CROSS-REFERENCE TO RELATED APPLICATION

The present application is claiming priority of Korean Patent Application No. 10-2004-0101848, filed on Dec. 6, 2004, the content of which is herein incorporated by reference.

BACKGROUND OF THE INVENTION

1. Field of the Invention

The present invention relates to a mobile communication terminal of which a menu can be universally constructed by using a mobile flash.

2. Background of the Related Art

A mobile flash is a general term of a solution capable of adapting a flash of macro-media to a mobile environment to produce and reproduce contents.

In a prior mobile communication terminal having a mobile flash mounted thereto, the mobile flash is simply used to download a flash movie or to reproduce the downloaded flash movie.

FIG. 1 is a block diagram showing a mobile communication terminal having a mobile flash mounted thereto, according to the prior art. As shown, the mobile communication terminal having the mobile flash mounted thereto may comprise a mobile input device section 11, a Man Machine Interface (MMI) 12, a mobile flash engine section 13, a mobile flash play section 14, and a display section 15.

An operating process of a flash movie in a handset terminal will be described with reference to FIG. 1.

Firstly, when a user requests reproduction of the flash movie through the mobile input device section 11 such as keyboard, a request signal is transmitted to the MMI 12. A task taking charge of the MMI 12 loads a corresponding flash movie file based on the request signal.

In the mean time, the MMI 12 performs a focus changing with the mobile flash engine section 13. Thereby, the mobile flash engine section 13 processes data received from the mobile input device section 11 to generate data to be reproduced, and the mobile flash play section 14 converts the generated data into a format that can be displayed through the display section 15 of the mobile communication terminal. At this time, it is possible to process a user interaction such as basic key input of the user through the mobile input device section 11.

The flash movie is reproduced on the display section of the mobile communication terminal through the above-mentioned procedures. Like this, the mobile communication terminal having the mobile flash mounted thereto according to the prior art can provide only functions of downloading and reproducing the flash movie contents.

SUMMARY OF THE INVENTION

Accordingly, the present invention has been made to provide a technology of using a mobile flash in constructing a menu of a mobile communication terminal. In other words, an object of the present invention is to provide a mobile communication terminal capable of universally constructing and updating a menu of the mobile communication terminal using a mobile flash. In addition, another object of the invention is to provide a universal and efficient menu and to provide an easiness of producing a flash movie to a contents provider by constructing and updating a menu tress using a flash movie in a mobile communication terminal having a mobile flash mounted thereto. In addition, it is another object that a user of a mobile communication terminal can personally construct a menu suitable to user's taste using a flash movie.

In order to accomplish the objects, there is provided a mobile communication terminal having a mobile flash mounted thereto, the terminal comprising: a mobile input device section for inputting a reproduction request of a flash movie; a Man Machine Interface (MMI) loading a corresponding movie file based on the reproduction request; a communication bridge module performing a communication with the MMI to monitor navigation events; a memory section for storing a Extendible Markup Language (XML) document having information about a handset configuration and a menu tree configuration of the mobile communication terminal; a mobile flash engine section parsing the XML document read from the memory section to map the XML document with the flash movie and analyzing the parsed XML document according to the navigation events; and a mobile flash play section for outputting the analyzed XML document contents through a display section.

BRIEF DESCRIPTION OF THE DRAWINGS

The above and other objects, features and advantages of the present invention will be more apparent from the following detailed description taken in conjunction with the accompanying drawings, in which:

FIG. 4 is a view showing an example of a menu tree configuration of a mobile communication terminal;

FIG. 5 is a view showing an example of a XML document type-menu tree configuration; and FIG. 6 is a view showing an example of the menu tree in FIG. 4 prepared with a XML document.

DETAILED DESCRIPTION OF THE PREFERRED EMBODIMENTS

A mobile communication terminal according to the invention can construct a menu thereof using a mobile flash. For doing so, the mobile communication terminal according to the invention stores a XML document having information about handset configuration and menu tree configuration in an internal memory, in advance. When constructing the menu, a corresponding mobile flash basically provides diverse functions and script languages for parsing the XML document and handling a document object model (DOM). Hereinafter, an embodiment of the invention will be more specifically described with reference to the accompanying drawings.

Figure 1:
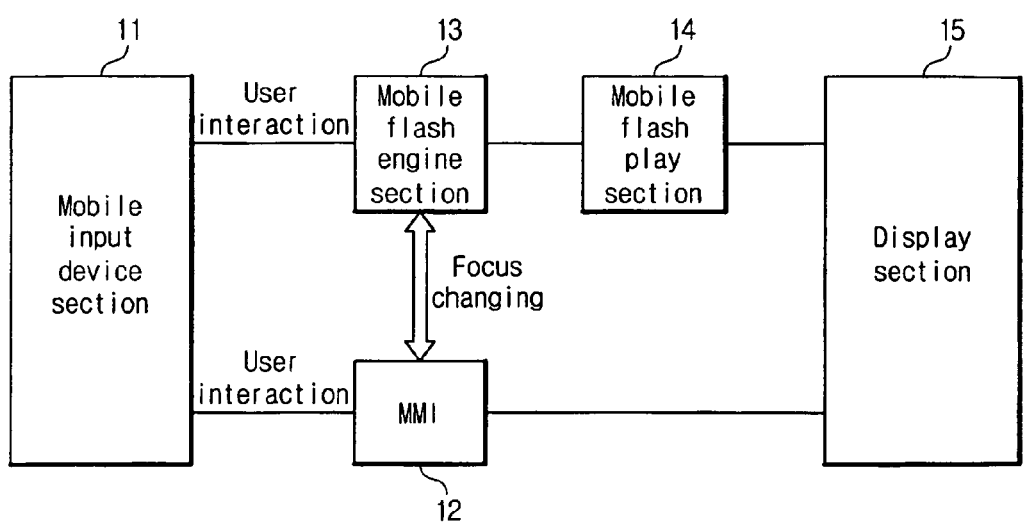
FIG. 1 is a block diagram showing a structure of a mobile communication terminal having a mobile flash mounted thereto according to the prior art.
Figure 2:
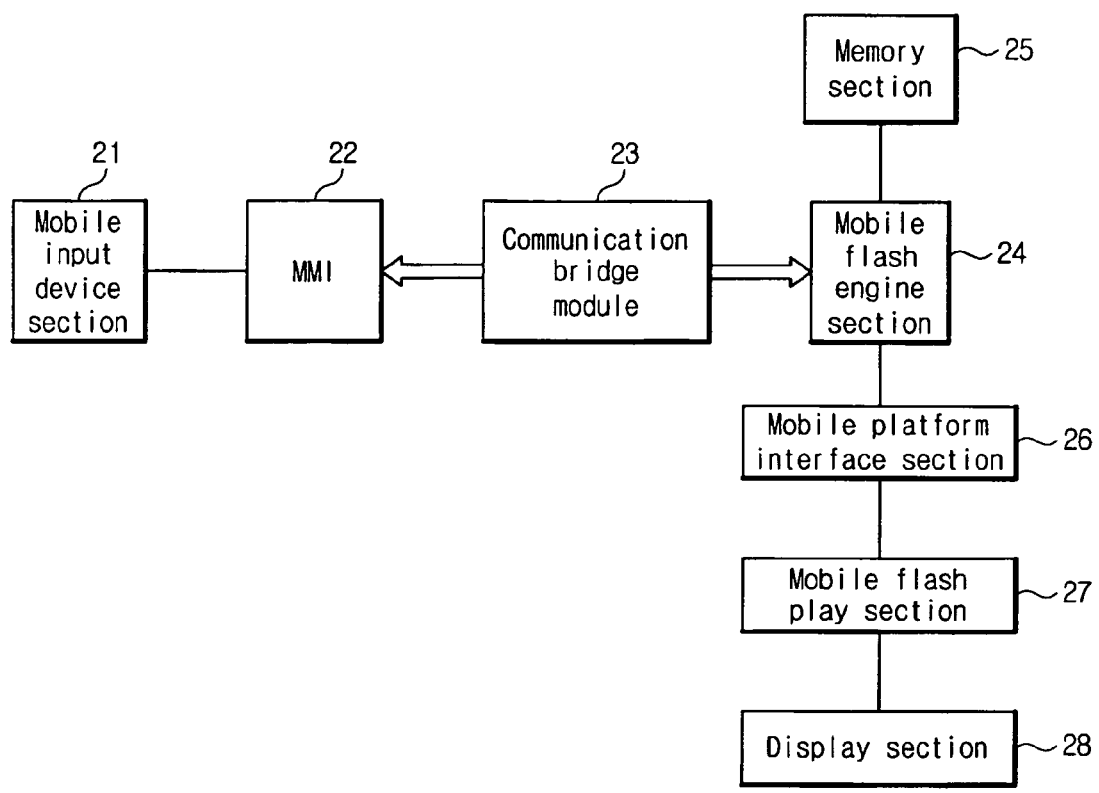
FIG. 2 is a block diagram showing a structure of a mobile communication terminal according to an embodiment of the invention.

A mobile communication terminal according to an embodiment of the invention may comprise, as shown in FIG. 2, a mobile input device section 21, a MMI 22, a communication bridge module 23, a mobile flash engine section 24, a memory section 25, a mobile platform interface section 26, a mobile flash play section 27 and a display section 28.

When a user requests reproduction of a flash movie, the mobile input device section 21 senses the request and transmits a request signal to the MMI 22. The user can request the reproduction of the flash movie, for example by manipulating keys on a keyboard provided to the mobile communication terminal.

The MMI 22 comprises a task taking charge of handset MMI and receives a reproduction request signal from the mobile input device section 21. The MMI 22 loads a flash movie file that is requested by the user, based on the request signal.

The communication bridge module 23 performs a communication with tasks in the MMI 22. In addition, it monitors navigation events such as menu movement in the mobile communication terminal. Additionally, the communication bridge module 23 makes the mobile flash engine section 24 to control a handset device. The communication bridge module 23 can use library functions of Java script Application Program Interface (API) and C-level provided by the mobile flash engine section when it monitors the navigation event.

The mobile flash engine section 24 parses the XML document stored in the memory section 25 within the mobile communication terminal to perform a mapping with the flash movie. In addition, the mobile flash engine section 24 analyzes a corresponding parsed XML document according to the navigation event such as menu movement in the mobile communication terminal and applies the analyzed information to the mobile platform interface section 26. Further, the mobile flash engine section 24 supports the library functions of Java script API and C-level and performs the handset device control through the communication bridge module 23.

The memory section 25 stores a program and data required for operation of the mobile flash engine section 24. In particular, the memory section 25 serves to store a XML document (handset XML profile) that is previously defined for the handset and menu tree configurations. In this case, in the XML document, size and menu tree configurations of the display section 28 of the mobile communication terminal can be constructed as node and element in the XML.

Each of the menu trees may be grouped into a menu item and the menu item may be constructed of four attribute elements, for example, a Menu Depth Level, a Menu String Token, a Menu Type and a Command. The attribute elements will be described in detail later.

The mobile platform interface section 26 receives the analyzed information of the XML document from the mobile flash engine section 24 and transmits the applied information to the mobile flash play section 27.

The mobile flash play section 27 converts the analyzed information of the XML document received from the mobile platform interface section 26 into a format that can be displayed through the display section 28.

The display section 28 displays the converted information applied from the mobile flash play section 27 so that the user can see it.

Figure 3:
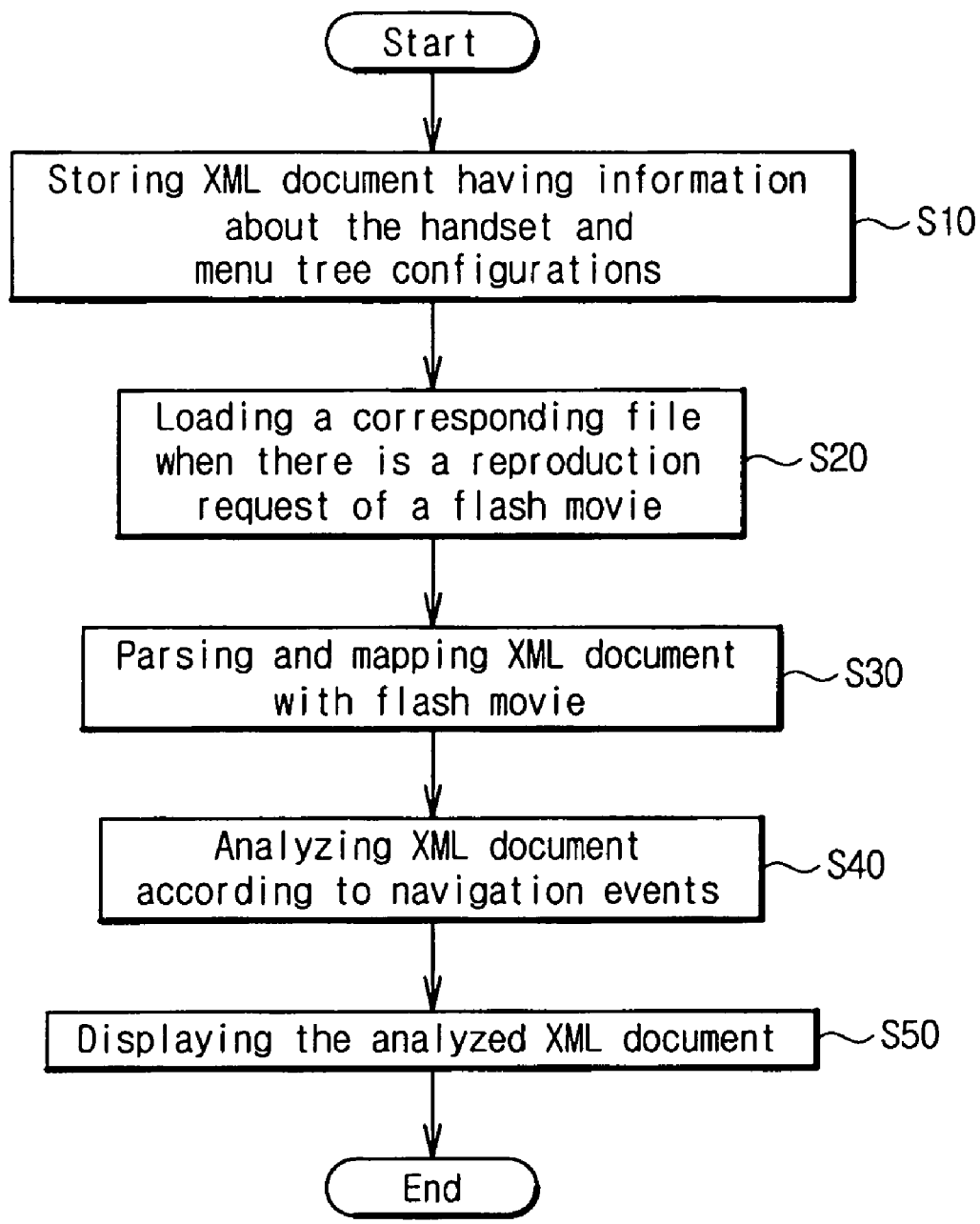
FIG. 3 is a flow chart showing an operating process of a mobile flash in the mobile communication terminal according to an embodiment of the invention.

Hereinafter, an operation of the mobile flash in the mobile communication terminal according to the embodiment of the invention will be described with reference to FIG. 3.

The mobile communication terminal according to the invention uses the mobile flash movie as a menu of itself using a XML document about the handset and menu tree configurations. Accordingly, according to the invention, the XML document (Handset XML Profile) about the handset and menu tree configurations is previously defined and stored in the memory section 25 within the terminal (S10).

FIG. 4 shows an example of a menu tree configuration of a mobile communication terminal. The menu tree configuration in the XML document stored in the memory section 25 will be described with reference to FIG. 4.

The menu tree shown in FIG. 4 consists of three steps of Depth Menus. As a first Depth Menu, there are Message, Call Logs, Sound, Settings and Organizer. As a second Depth Menu, there are SMS/EMS and MMS in a corresponding Message, and Received Calls, Dialed Calls and Missed Calls in corresponding Call Logs, and Ringing Settings, Message Alert and Key tone in corresponding Sound, and a Display in corresponding Settings, and Alarm, Scheduler, Memo, Calculator, Converter and Stop watch in corresponding Organizer. As a third depth, there are Creation and Inbox in corresponding SMS/EMS.

In the mean time, the XML document about the handset and menu tree configurations may be constructed as shown in FIG. 5. Regarding each of nodes in FIG. 5, it can be seen that the tree configurations for LCD display size and menu of the display section 28 are constructed as node and element in the XML.

In addition, in FIG. 5, each of the menu trees has at least one menu item, and each of the menu items has four attribute elements consisting of a Menu Depth Level, a Menu String Token, a Menu Type and a Command.

The Menu Depth Level indicates how many level depths on the tree. The Menu String Token is a title of the corresponding menu and this value appears as an input value of text menu on the movie and can be used as a mapping of the display screen in the flash. The Menu Type indicates whether an elements corresponding to it has an offspring, and is a very important factor in constructing the menu tree. The Command is an action command to be used in the corresponding menu, indicates function and command for performing a function corresponding to it, and is transmitted to the communication bridge module 23 and used to request a necessary function.

FIG. 6 shows an example of the menu tree shown in FIG. 4 prepared with a XML document. Under state that a XML document having information of handset and menu tree configurations as shown in FIG. 6 is stored in the memory section 25 (S10), if a user requests reproduction of a flash movie through the mobile input device section 21 such as keyboard and the like, the MMI 22, i.e., the task taking charge of an existing handset MMI receives a reproduction request signal from the mobile input device section 21 and thus loads a corresponding flash movie file which is requested by the user (S20).

The mobile flash engine section 24 parses the XML document stored in the memory section 25 and performs a mapping with the flash movie (S30). At this time, the parsed XML document is analyzed according to navigation events such as menu movement in the mobile communication terminal (S40).

The mobile flash play section 27 receives the information analyzed in the mobile flash engine section 24 through the mobile platform interface section 26 and makes the analyzed information to be outputted through the display section 28 (S50).

In the mean time, in order to smoothly perform the above-mentioned operations interworkingly in the mobile communication terminal, it is required a communication between the mobile flash engine section 24 and the tasks of the MMI 22. The communication bridge module 23 may be provided for such communication function.

Since the mobile flash engine section 24 supports the library functions of Java script API and C-level, it embodies the communication bridge module 23 performing the functions of monitoring and transferring the events using the library functions of Java script API and C-level and allows the module to control the handset device.

As described above, according to the invention, it is possible to construct and reuse the efficient menu user interface by using the XML about the mobile flash and handset information. In addition, it is possible to provide an easiness of producing a menu flash and a universal use way to a contents provider. Further, a user can personally construct and download a menu to the mobile communication terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication terminal having a mobile flash mounted thereto, comprising:
    a mobile input device section for inputting a reproduction request of a flash movie;
    a Man Machine Interface (MMI) loading a corresponding movie file based on the reproduction request;
    a communication bridge module performing a communication with the MMI to monitor navigation events;
    a memory section for storing a Extendible Markup Language (XML) document having information about a handset configuration and a menu tree configuration of the mobile communication terminal;
    a mobile flash engine section parsing the XML document read from the memory section to map the XML document with the flash movie and analyzing the parsed XML document according to the navigation events; and
    a mobile flash play section for outputting the analyzed XML document contents through a display section.

2. The mobile communication terminal according to claim 1, wherein the communication bridge module uses library functions of Java script API and C-level so as to monitor the navigation events.

3. The mobile communication terminal according to claim 2, wherein the library functions of Java script API and C-level are provided by the mobile flash engine section.

4. The mobile communication terminal according to claim 1, further comprising a mobile platform interface section receiving and transferring the analyzed information from the mobile flash engine section to mobile flash play section.

5. The mobile communication terminal according to claim 1, wherein the XML document contains information about a display size of the mobile communication terminal.

6. The mobile communication terminal according to claim 5, wherein the XML document constructs display size and menu tree configurations as a node and an element in the XML document.

7. The mobile communication terminal according to claim 1, wherein the menu tree is grouped into at least one menu item and each of the menu items has Attribute elements of a Menu Depth Level, a Menu String Token, a Menu Type and a Command.

* * * * *